2,465,679

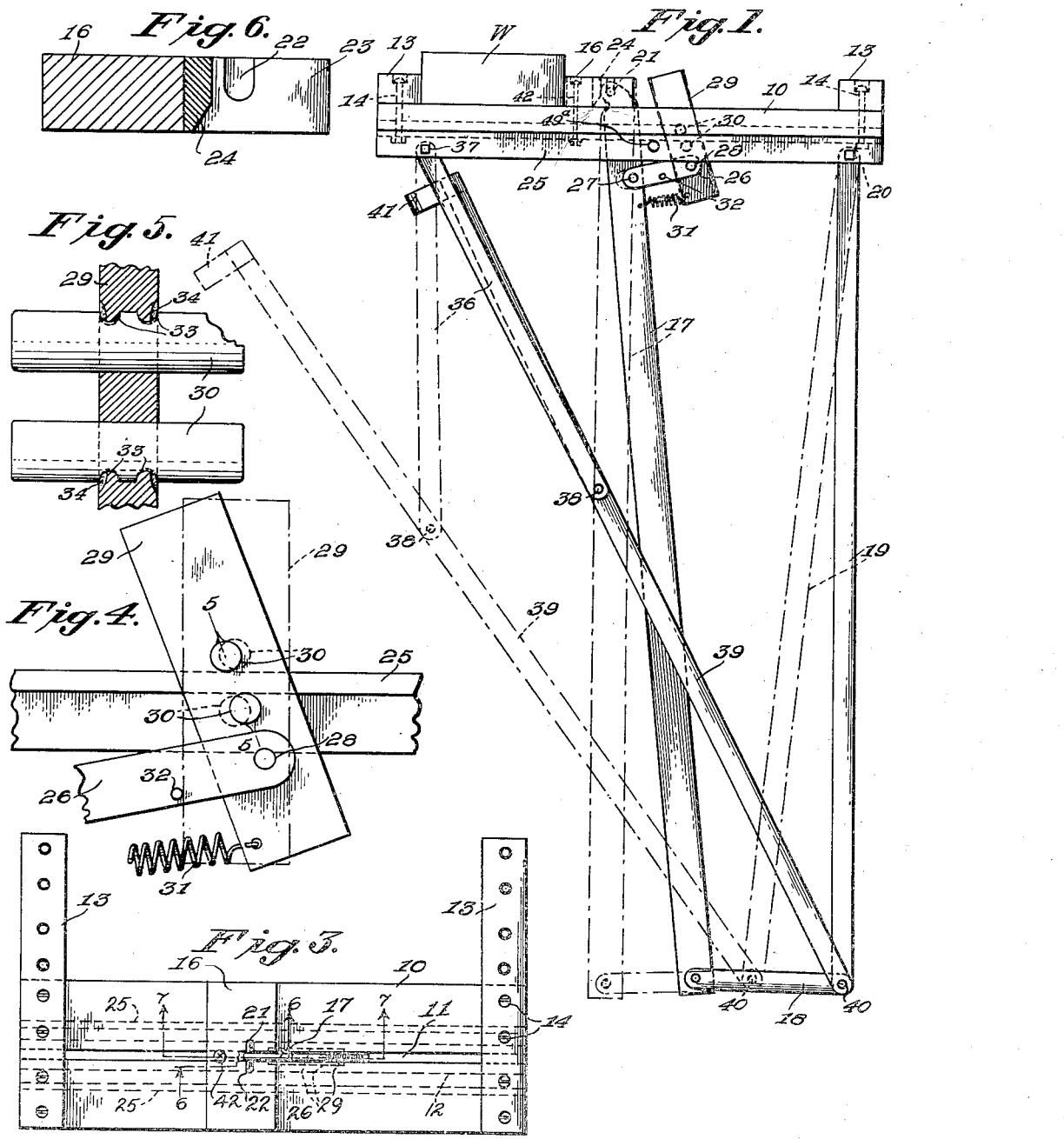

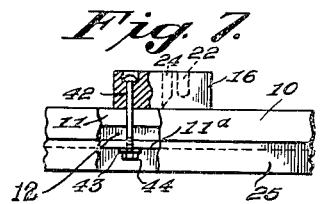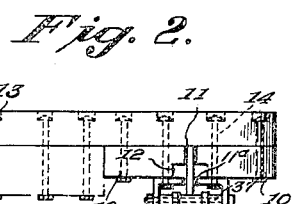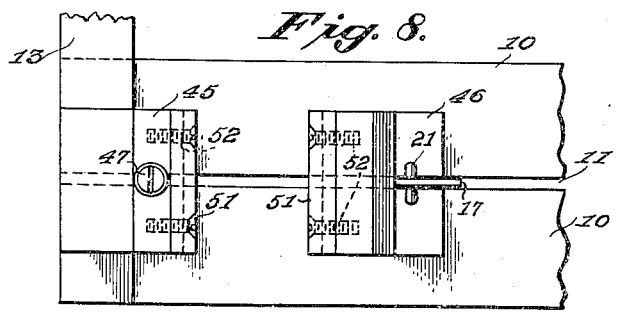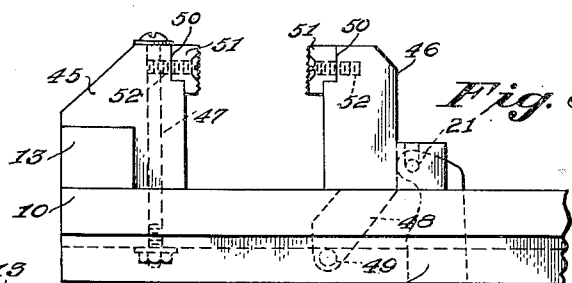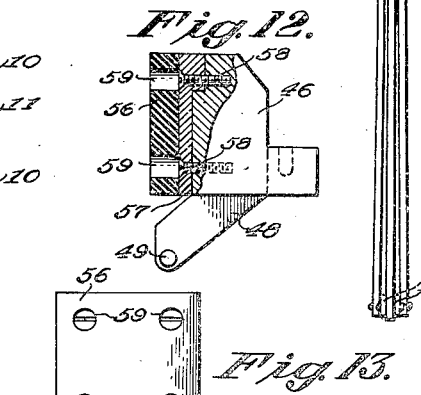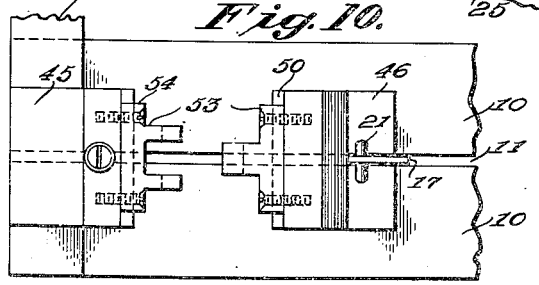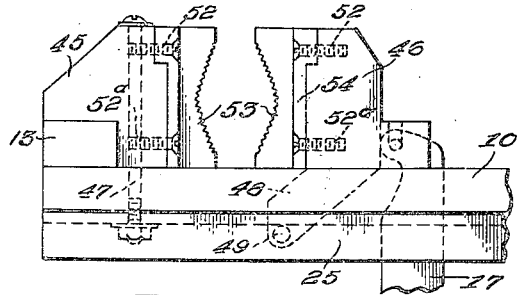
INVENTORS
Paul A. Fleury
BY Paul A. Fleury, IV.
ATTORNEY Patented Mar. 29, 1949

UNITED STATES PATENT OFFICE 2,465,679

SLIDABLE VISE JAW LOCKED AND ACTUATED BY SYSTEM OF LEVERS

Paul A. Fleury and Paul A. Fleury, IV,
Baltimore, Md.

Application May 16, 1946, Serial No. 670,051

8 Claims. (Cl. 81—17)

1

This invention relates to a vise structure.

A primary object of the invention is the provision of an improved vise structure which is of maximum efficiency and which is capable of operation by a workman with the expenditure of a minimum of time and effort.

A further object of the invention is the provision of a vise structure comprising a fixed work-gripping member and a second work-gripping member movable toward and from the fixed member, the movable member being capable of being freely moved by an operator's hand toward and away from work disposed between same and the fixed member, lever means within convenient reach of the operator for moving the movable member into gripping contact with the work, and locking means movable with the movable gripping member and acting to lock same in gripping position upon actuation of the lever means.

A practical embodiment of the invention is illustrated in the accompanying drawings, forming a part of this specification, and wherein Figure 1 is a side elevational view of the improved vise disclosing the operating parts in full lines with work clamped in position, and showing the position of the operating parts in dot-and-dash lines prior to or subsequent to the clamping action.

Fig. 2 is a front elevational view of the structure of Fig. 1.

Fig. 3 is a top plan view of the vise base showing the means for detachably connecting same to a work bench.

Fig. 4 is a fragmentary enlarged side elevational view showing the locking plate in its locked position in full lines and its position in dot-and-dash lines when grasped by an operator's hand for moving the movable head away from the work.

Fig. 5 is an enlarged section in the plane of line 5—5 Fig. 4.

Fig. 6 is a vertical section through the movable head, as taken on the line 6—6 of Fig. 3.

Fig. 7 is a view partially in side elevation and partially in section as taken on the line 7—7 of Fig. 3, showing the relation of the movable head to the base structure of the vise.

Fig. 8 is a fragmental top plan view of a modified form of the invention.

Fig. 9 is a side elevation of the structure of Fig. 8.

Fig. 10 is a view similar to Fig. 8 of a further embodiment of the invention.

Fig. 11 is a side elevation of the structure of Fig. 10.

2

Fig. 12 is a view in side elevation and section of a modified form of movable head.

Fig. 13 is a front elevational view of the structure of Fig. 12.

Referring now in detail to the drawings by use of reference characters, 10 designates a pair of rails whose adjacent edges are in spaced relation in the provision of a slot 11 and the rails are rabetted at their adjacent lower corners in the provision of a channel 12, opening into the slot 11.

Two bars 13 are secured as by bolts 14 to corresponding ends of the rails 10 for holding same in position, and the bars extend laterally beyond the rails as at 15, Figs. 2 and 3, for attachment to a work bench, or the like, B.

It will be observed from Fig. 3 that the bars 13 are formed with apertures for receiving the bolts 14, and that such apertures are provided throughout the lengths of the bars in symmetrical relation relative to the centers thereof, whereby the bars may be reversed from the positions in which they are shown in Fig. 3.

The front bar 13 provides a stationary head against a vertical face of which the work W is adapted to be clamped by the movable head 16, to which is pivotally connected the upper end of a pressure or thrust bar 17, the lower end of which is pivotally connected to adjacent ends of a pair of links 18. The opposite ends of links 18 are pivotally connected at 40 to the lower end of a lever bar 19, the upper end of which is pivotally connected between and adjacent to the rear ends of the vertical flanges of angle bars 25, as at 20.

The pivotal connection of the upper end of pressure bar 17 with the movable head 16 is effected by a pin 21 extending through pressure bar 17 and projecting from opposite faces of the bar and loosely resting in recesses 22 which open through the upper face of the movable head 16 and into a central slot 23 in which the upper end of pressure bar 17 is freely movable.

The movable head 16, if constructed of wood, is provided with a metallic wear-plate 24.

The pressure bar 17 extends through slot 11 as well as an alined slot 11ᵃ defined between adjacent edges of angle bars 25, which angle bars extend the full length of rails 10 beneath said rails and are secured in position by some of the bolts 14.

Corresponding ends of a pair of links 26 are pivotally connected as at 27 to the pressure bar 17 adjacent to the upper end thereof. The opposite ends of links 26 are pivotally connected at 28 to a rectangular locking plate 29 which extends through slots 11 and 11ᵃ.

The plate 29 functions as locking device and for this purpose is provided with a pair of pins 30 which, as indicated in Fig. 5, extend through the plate 29 and protrude equally from both faces thereof.

The plate 29 is normally retained in a slightly inclined position by means of a compression spring 31 having its opposite ends connected to bar 17 and plate 29 below the pivotal connection 28 (Fig. 1), the spring urging the plate counterclockwise and holding plate 29 in a locking position. A pin 32 through links 26 prevents plate 29 from passing a vertical position and locking in reverse when movable head 16 is being disengaged from work W.

The pins 30 are grooved as at 33, and plate 29 is center-punched as at 34, Fig. 5, in the provision of projections frictionally engaged in the grooves for retaining pins 30 in position and precluding rotation thereof in plate 29.

The pins 30 are disposed on opposite sides of the horizontal flanges of angle bars 25 with the upper pin resting and movable in the channel 12, and the pins are slightly spaced from corresponding faces of angle bars 25 when plate 29 is in a vertical position, as is indicated in Fig. 4. The locking of plate 29, thus preventing movement longitudinally along rails 10, is effected by the gripping action of pins 30 on angle bars 25 when plate 29 is forced to a further inclined position, as indicated by solid lines in Figs. 1 and 4.

A pair of lever arms 36 are pivotally secured at 37 at their upper ends between and adjacent to the front ends of the vertical flanges of angle bars 25, and the lower ends of these lever arms are pivotally secured as at 38 to intermediate points of a pair of actuating bars 39, the lower ends of which are pivotally connected at 40 to the adjacent ends of lever bar 19 and links 18.

The bars 39 are provided with a handle 41 for moving the bar and lever arrangement from the dot-and-dash line position to the full line position in Fig. 1 as well as for the reverse operation. If desired, the handle 41 may be replaced by a suitable body or knee press.

In the operation of the structure as above described and with the movable head 16 at any position relative to the stationary head 13, the work W is placed in position against the stationary head 13. The movable head 16 is then moved up to the work W, the plate 29 being in a slightly inclined position and pins 30 out of fast gripping contact with the angle bars 25, thereby permitting easy forward movement of the head 16 longitudinally on the rails 10.

With the head 16 in contact with the work W, the handle 41 is grasped by an operator's hand and the arms 36 and bars 39, which in effect provide a toggle, are moved to the solid line position as in Fig. 1 with pivot 38 slightly beyond a line passing through pivots 37 and 40, thereby preventing inadvertent unlocking.

Upon movement of handle 41 and the toggle formed by arms 36 and bars 39, the lever bar arrangement is moved from the dot-and-dash line position to the full line position in Fig. 1. Plate 29 will move from its slightly inclined inoperative position to a further inclined position through movement of pressure bar 17 and links 26, and when in such position, with pins 30 in gripping engagement with the angle bars 25, pivot 27 will become fixed and the upper end of bar 17 will force the head 16 into tight gripping engagement with the work W.

While the head 16 will move toward the work W in this locking action, such movement will be slight and is shown exaggerated by dotted lines in Fig. 1. Also the movement of plate 29 is shown exaggerated by dotted lines. While in Fig. 1 the movement of pressure bar 17 would indicate a substantial movement of links 26, such movement is in fact slight, since the pressure bar and other parts yield or flex in the movement from the dot-and-dash to the solid line position which, of course, is essential for proper operation of the device.

To disengage work W, handle 41 is moved towards the operator, unlocking arms 36 and bars 39, thereby releasing the pressure of head 16 upon the work W. The top of plate 29 is then grasped by the operator and moved to a vertical position (Fig. 4), relieving the pins 30 from their gripping contact with angle bars 25 and permitting easy movement of head 16 along rails 10 away from work W.

As indicated in Fig. 7, the movable head 16 is retained against upward movement from the rails 10 by means of a bolt 42 which extends through same and slots 11 and 11ª. A washer 43 is applied at the lower end of the bolt in bearing engagement with the lower faces of the angle bars 25, being so retained by a nut 44.

In Figs. 8 and 9 are illustrated modified forms of stationary and moveable heads and wherein 45 is the stationary head and 46 is the movable head.

The head 45 is provided with a retaining bolt 47 and the head 46 is provided with a depending tongue 48 which extends through slots 11 and 11ª and between the angle bars 25, and is provided with a pin 49 below and riding along the lower faces of the angle bars. Holes 49ª (Fig. 1) are provided in vertical sections of angle bars 25 at center for installation and removal of pin 49. These heads may be used for work as in Figs. 1 and 2, but same are provided with recesses 50 at their upper adjacent corners for reception of serrated blocks 51 which are removably secured to the heads by bolts 52.

The structure of Figs. 10 and 11 shows the blocks 51 as having been removed and replaced by pipe gripping serrated blocks 53 having flanges 54 which embody enlarged portions fitting into recesses 50, and the flanges are secured to the heads by bolts 52 and 52ª.

The structure according to Figs. 12 and 13 includes a movable head 46 having a rubber or yieldable face pad 56 adhered to a metallic base plate 57 which is secured to the head by bolts 58, the heads of which are passable through holes 59 in the yieldable pad. A companion rubber or yieldable pad 56 and plate 57 will be used on stationary head 45, but are not shown in Figs. 12 and 13.

While we have disclosed what we now consider to be a preferred embodiment of the invention in such manner as the same may be readily understood by those skilled in the art, we are aware that changes may be made in the details disclosed without departing from the spirit of the invention as expressed in the following claims.

What we claim and desire to secure by U. S. Letters Patent is:

1. A vise comprising a base member having a longitudinal slot therein, a work clamping member fixed to said base member, a second work clamping member supported by said base member for movement toward and away from the fixed member, a substantially vertically disposed pressure bar extending through said slot and having its upper end pivotally connected to the movable clamping member and its lower end swingably suported from said base member, manually operable means for swinging said pressure bar in the vertical plane of said slot, and locking means mounted on said base member and pivotally connected to said pressure bar, said locking means being operative upon swinging movement of the lower end of said pressure bar away from said fixed clamping member to clutch said base member and retain the movable clamping member against movement away from the fixed clamping member.

2. A vise comprising a pair of parallel laterally spaced guide rails defining a slot therebetween, a work clamping member fixed adjacent to corresponding ends of the guide rails, a second work clamping member movably supported on the guide rails, a substantially vertically disposed pressure bar extending through said slot and having its upper end pivotally connected to the movable clamping member, means pivotally supporting the lower end of the pressure bar for movement thereof in the vertical plane of said slot, manually operable means for swinging said pressure bar about its pivotal connection with said movable clamping member and for swinging the lower end of said pressure bar in a direction away from said fixed clamping member, a plate extending through said slot adjacent to said pressure bar and pivotally connected to said pressure bar, and means carried by the plate above its pivotal connection with the pressure bar and engageable with the base member upon said swinging movement of the pressure bar about its pivotal connection with the movable clamping member for locking the movable clamping member against movement away from the fixed clamping member.

3. The structure according to claim 2, together with a pair of laterally spaced angle bars respectively secured to the lower faces of said guide rails and defining therebetween a second slot alined with said first mentioned slot, and wherein said last mentioned means comprises a pin extending through said plate above and below said second slot and engageable with the opposite faces of said angle bars in effecting said locking action.

4. The structure according to claim 2, wherein the lower end of said pressure bar is pivotally supported by adjacent ends of a pair of links whose opposite ends are pivotally connected to the lower end of a lever bar having its upper end pivotally connected to said base, and wherein said manually operable means comprises a toggle member having opposite ends thereof pivotally connected with said base and with the lower end of said lever bar.

5. The structure according to claim 2, wherein said movable clamping member rests upon the upper faces of said rails and is provided with a vertically disposed bolt extending through said slot and having a head at the lower end thereof engageable with the base below said slot for maintaining the movable clamping member in slidable engagement with the guide rails.

6. In a vise including a pair of laterally spaced angle bars having horizontal flanges whose opposite edges are in spaced relation in defining a slot therebetween, an elongated locking plate extending through said slot, two pins extending through said plate, one above and the other below said slot and both projecting equidistances from opposite faces of said plate, said pins being spaced a distance slightly greater than the thickness of said flanges whereby said plate is capable of movement along said angle bars when moved to a position at right angles thereto, yieldable means normally maintaining said plate in an inclined position with said pins in engagement with the opposite faces of said flanges, and manually operable means having a connection with said plate between said pins and one end of the plate for further urging said plate in the direction of said inclined position for locking engagement of said pins with the opposite faces of said flanges.

7. The structure according to claim 6, wherein said pins are cylindrical and are each provided with straight grooves in the portions thereof disposed within said locking plate, the grooves being at right angles to the axes of the pins and the locking plate having projections frictionally engaged in said grooves for locking said pins against both axial and rotary movement with respect to said locking plate.

8. The structure according to claim 2, wherein said movable clamping member is provided with a vertical slot in one end thereof, laterally alined recesses in the opposite walls of said slot for removably receiving a pin included in said pivotal connection of the upper end of said pressure bar to said movable clamping member, and a metallic wearplate at the base of said slot.

PAUL A. FLEURY.
PAUL A. FLEURY, IV.

REFERENCES CITED

The following references are of record in the file of this patent:

UNITED STATES PATENTS

| Number | Name | Date |
|---|---|---|
| 665,398 | Broadbooks | Jan. 8, 1901 |
| 823,149 | White | June 12, 1906 |
| 824,000 | Elmer | June 19, 1906 |
| 912,543 | Cobb | Feb. 16, 1909 |
| 918,946 | Bashore et al. | Apr. 20, 1909 |
| 1,027,941 | Viezzi | May 28, 1912 |
| 1,326,804 | Taylor | Dec. 30, 1919 |
| 1,480,564 | Morrison | Jan. 15, 1924 |
| 1,566,764 | Murphy | Dec. 22, 1925 |

FOREIGN PATENTS

| Number | Country | Date |
|---|---|---|
| 521,392 | Germany | Mar. 24, 1931 |